(12) United States Patent
VanBlon et al.

(10) Patent No.: US 10,277,402 B2
(45) Date of Patent: Apr. 30, 2019

(54) DIGITALLY SIGNING A DOCUMENT

(71) Applicant: LENOVO (Singapore) PTE, LTD., New Tech Park (SG)

(72) Inventors: Russell Speight VanBlon, Raleigh, NC (US); Grigori Zaitsev, Durham, NC (US); Jianbang Zhang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 53 days.

(21) Appl. No.: 14/642,584

(22) Filed: Mar. 9, 2015

(65) Prior Publication Data
US 2016/0269184 A1    Sep. 15, 2016

(51) Int. Cl.
*H04L 9/32* (2006.01)

(52) U.S. Cl.
CPC .......... *H04L 9/3247* (2013.01); *H04L 9/3231* (2013.01); *H04L 9/3263* (2013.01)

(58) Field of Classification Search
CPC . H04L 9/3247; H04L 9/3263; H04L 2209/60; H04L 9/3236; H04L 9/3281; H04L 9/3294; H04L 9/3231; H04L 2209/72; G06F 21/64
See application file for complete search history.

(56) References Cited

U.S. PATENT DOCUMENTS

| | | | | |
|---|---|---|---|---|
| 7,395,503 B1 * | 7/2008 | Pravetz | ................. | G06F 17/212 715/268 |
| 8,856,640 B1 * | 10/2014 | Barr | ................... | G06F 17/2288 713/158 |
| 2002/0023220 A1 * | 2/2002 | Kaplan | ............... | H04L 63/0823 713/176 |
| 2005/0039015 A1 * | 2/2005 | Ladanyi | ............. | G06K 9/00154 713/176 |
| 2006/0075245 A1 * | 4/2006 | Meier | ..................... | G06F 21/64 713/176 |
| 2006/0184452 A1 * | 8/2006 | Barnes | .................. | G06Q 40/00 705/50 |
| 2008/0072334 A1 * | 3/2008 | Bailey | .................... | G06Q 10/10 726/28 |
| 2008/0148054 A1 * | 6/2008 | Cahill | ..................... | G06F 21/64 713/176 |
| 2010/0287196 A1 * | 11/2010 | Shields | ............. | G06F 17/30781 707/769 |
| 2011/0231666 A1 * | 9/2011 | Guenther | ................ | G06F 21/32 713/186 |

(Continued)

OTHER PUBLICATIONS

Hogg, Secrecy and Signatures—Turning the Legal Spotlight on Encryption and Electronic Signatures, 2006.*

(Continued)

*Primary Examiner* — Hadi S Armouche
*Assistant Examiner* — Huan V Doan
(74) *Attorney, Agent, or Firm* — Kunzler, PC

(57) ABSTRACT

For digitally signing a document, an apparatus, method, and computer program product are disclosed. The apparatus includes a processor and a memory that stores code, executable by the processor, including code that: detects a trigger, searches a digital document for a user signature in response to the trigger, and applies a digital signature to the digital document in response to the digital document including a user signature. In some embodiments, the digital signature may be based on the user signature.

20 Claims, 5 Drawing Sheets

(56) References Cited

U.S. PATENT DOCUMENTS

| | | | | |
|---|---|---|---|---|
| 2011/0239111 A1* | 9/2011 | Grover | ............... | G06F 17/273 |
| | | | | 715/257 |
| 2013/0160102 A1* | 6/2013 | Decara | ............... | G06F 21/33 |
| | | | | 726/7 |
| 2014/0002383 A1* | 1/2014 | Hsieh | ............... | G06F 3/017 |
| | | | | 345/173 |
| 2015/0113282 A1* | 4/2015 | Basil | ............... | H04L 63/0861 |
| | | | | 713/176 |
| 2015/0172058 A1* | 6/2015 | Follis | ............... | H04L 9/3247 |
| | | | | 713/176 |
| 2016/0020908 A1* | 1/2016 | Kundu | ............... | H04L 9/3247 |
| | | | | 713/176 |
| 2016/0179776 A1* | 6/2016 | Bartley | ............... | G06F 17/242 |
| | | | | 715/268 |

OTHER PUBLICATIONS

Nentwich et al., Practical Security Aspects of Digital Signature Systems, Jun. 2006.*

Chen et al., Electronic Medical Archives: A Different Approach to Applying Re-signing Mechanisms to Digital Signatures, 8 pages (Year: 2011).*

Boudrez, Digital signatures and electronic records, 13 pages (Year: 2006).*

Munoz, Electronic Documents in Legal Works, 5 pages (Year: 2004).*

* cited by examiner

DIGITALLY SIGNING A DOCUMENT

BACKGROUND

Field

The subject matter disclosed herein relates to digital signatures and more particularly relates to digitally signing a digital document.

Description of the Related Art

Conventionally, electronic documents are digitally signed using a cryptographic scheme to prove who the document came from. Some electronic documents allow a user to insert a known "signature field" into the electronic document. However when any changes are made the electronic document, the digital signature is invalidated.

BRIEF SUMMARY

An apparatus for digitally signing a document is disclosed. A method and computer program product also perform the functions of the apparatus. The apparatus includes a processor and a memory that stores code, executable by the processor, including code that: detects a trigger, searches a digital document for a user signature in response to the trigger, and applies a digital signature to the digital document in response to the digital document including a user signature.

The apparatus, in one embodiment, generates a digital signature for the digital document, the digital signature being generated based on the user signature. The apparatus, in another embodiment, generates a digital signature for the digital document, the digital signature being selected based on an identity of a user indicated by the user signature.

The apparatus, in some embodiments, verifies the user signature, wherein applying the digital signature includes applying the digital signature in response to the user signature being a valid signature. Verifying the user signature, in one embodiment, may include accessing a user profile based on the user signature and checking whether the user is authorized to sign the digital document based on the user profile. Verifying the user signature, in another embodiment, may include comparing the user signature to a plurality of valid user signatures. Verifying the user signature, in another embodiment, may include comparing a handwriting characteristic of the user signature to the corresponding handwriting characteristic of a user identified by the user signature.

The apparatus, in one embodiment, may include an electronic device that opens the digital document, wherein the digital signature is based on an identity of the electronic device. The apparatus, in another embodiment, may include a digitizer that receives the user signature. The apparatus, in another embodiment, may include an imager that creates the digital document from a physical document, the creation of the digital document being the trigger for searching the digital document.

A method includes: receiving a trigger, detecting, by use of a processor, a user credential associated with a digital document responsive to the trigger, and applying a digital signature to the digital document, the digital signature based on the user credential. In one embodiment, the method includes creating a digital signature using a private key associated with the user credential. In another embodiment, the method includes selecting a digital signature from a plurality of predefined digital signatures based on the user credential. The trigger may be saving the digital document, closing the digital document, or transferring the digital document.

The method may also include verifying the user credential, wherein applying the digital signature includes applying a digital signature in response to the user credential being valid. The method may include detecting a digital signature for the digital document responsive to the trigger and verifying that the user credential matches the detected digital signature.

In one embodiment, the method includes reapplying the digital signature in response to the user editing the digital document within a predetermined time period of application of the digital signature. In another embodiment, the method includes reapplying the digital signature in response to the user correcting spelling within the digitally signed digital document.

The method may also include detecting an attempt to transfer the digitally signed document, checking the validity of the digital signature, validating the sender in response to the digital signature being out of date, and reapplying the digital signature to the digital document in response to validating the sender.

A program product including a computer readable storage medium that stores code executable by a processor, the executable code including code to perform: detecting a trigger, identifying a user signature in a digital document responsive to the trigger, verifying the user signature, and applying a digital signature to the digital document, the digital signature based on the user signature. In one embodiment, the program product reapplies the digital signature to the digital document in response to the user editing the digital document before closing the digital document.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
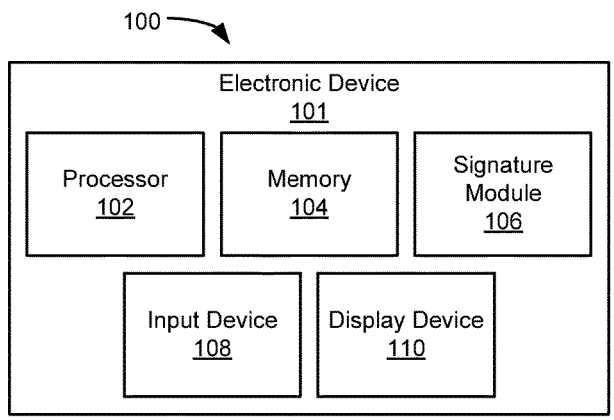
FIG. 1 is a schematic block diagram illustrating one embodiment of a system for digitally signing a document.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the described embodiments monitor for trigger, detected user signature in a digital document, and apply the digital signature to the digital document. In response to the trigger, the described embodiments determine whether user signature exists in the digital document. For example, a signature field may be identified and checked for signature within the signature field, user input may be analyzed to determine if it's a user signature, and/or the digital document may be scanned for handwriting indicative of a user signature.

Some embodiments describe creating a digital signature based on the user signature. For example, the user signature may be generated on-the-fly using the user signature as an input. As another example, a private/public key belonging to the user selected based on the user signature, wherein the digital signature is created using the private key. Some embodiments describe selecting a digital signature based on the user signature. For example, a digital signature may be selected from a database containing a plurality of signatures, each signature belonging to an authorized user. The user signature be used to identify an authorized user, wherein the digital signature is selected based on the authorized user.

In some embodiments, the user signature is verified prior to applying the digital signature. For example, a user profile may indicate whether a user is authorized to sign the digital document. As another example, spelling of the user signature may be checked to verify the user. In certain embodiments, characteristics of the detected user signature may be compared to a database of user signatures to verify the user. In other embodiments, biometrics or other credentials of the user may be checked. Additionally, in some embodiments, the user is prompted for confirmation that they intend to sign the digital document.

After initial signing, if the user makes edits in the same application session, the signature may be reapplied after edits are made. The amount of editing allowed before an automatic re-signing may be user configurable. For example, edits may be allowed only the user signed via pen during the same application session. As another example, edits may be allowed if there spelling and/or grammar corrections. In some embodiments, automatic re-signing may not be available if an amount of edits exceeds a limit and/or the edits are to terms having significant meaning within the digital document. For example, edits to numbers, dates, names, proper nouns, or other words may have significant meanings within the document. In a further embodiment, the digital document may be automatically re-signed if the user initials the document after making an amount of edits exceeds a limit and/or the edits are to terms having significant meaning within the digital document.

If the system or apparatus is confident the user editing is the signer (for example, after verifying via extended credentials), the digital signature may be re-applied in subsequent application sessions, as configured by the user. Additionally, if the signature is detected to be invalid or out of date at the time of transferring the file, the user may be prompted to provide extra credentials at the time of transfer, or before the transfer takes place. In some embodiment, verifying via extended credentials may be skipped if the user recently supplied credentials to the device.

FIG. 1 depicts a system 100 for digitally signing a document, according to embodiments of the disclosure. The system 100 includes an electronic device 101. The electronic device may be any digital device capable of receiving a user signature and digitally signing a document, including, but not limited to, a mobile phone, a smart phone, a tablet computer, a laptop computer, a desktop computer, a mainframe computer, or other computing device. The electronic device 101 includes a processor 102, a memory 104, a signature module 106, and an input device 108.

The processor 102, in one embodiment, may comprise any known controller capable of executing computer-readable instructions and/or capable of performing logical operations. For example, the processor 102 may be a microcontroller, a microprocessor, a central processing unit (CPU), a graphics processing unit (GPU), an auxiliary processing unit, a FPGA, or similar programmable controller. In some embodiments, the processor 102 executes instructions stored in the memory 104 to perform the methods and routines described herein. The processor 102 is communicatively coupled to the memory 104, the signature module 106, and the input device 108.

The memory 104, in one embodiment, is a computer readable storage medium. In some embodiments, the memory 104 includes volatile computer storage media. For example, the memory 104 may include a random access memory (RAM), including dynamic RAM (DRAM), synchronous dynamic RAM (SDRAM), and/or static RAM (SRAM). In some embodiments, the memory 104 includes non-volatile computer storage media. For example, the memory 104 may include a hard disk drive, a flash memory, or any other suitable non-volatile computer storage device. In some embodiments, the memory 104 includes both volatile and non-volatile computer storage media.

In some embodiments, the memory 104 stores data relating to digitally signing a document for example, the memory 104 may store cryptographic keys, digital certificates, user profiles, handwritten signature samples, and the like. In some embodiments, the memory 104 also stores program code and related data, such as an operating system or other controller algorithms operating on the electronic device 101.

The signature module 106, in one embodiment, is configured to monitor for a trigger, search a digital document for a user signature responsive to the trigger, and apply a digital signature to the digital document in response to detecting the user signature. The trigger may be an action reasonably expected to indicate that the digital document is finalized including, but not limited to, saving the digital document, closing the digital document, and attempting to transfer the digital document.

In some embodiments, the signature module 106 applies the digital signature to the digital document based on the detected user signature. In one embodiment, the digital signature is calculated based on a cryptographic key associated with the user signature. In another embodiment, the digital signature is selected from a plurality of predefined digital signatures based on the user signature.

In some embodiments, the signature module 106 verifies the user signature prior to applying the digital signature. For example, the signature module 106 may verify that the signatory is authorized to sign the digital document. As another example, the signature module 106 may verify that the signatory has a cryptographic key and/or predefined digital signature stored on file in the memory 104.

The input device 108, in one embodiment, may comprise any known computer input device including a touch panel, a button, a keyboard, or the like. For example, the input device 108 may be an input device configured to receive a user signature, such as a signature pad, touch-sensitive digitizer, and/or handwriting input unit operatively coupled to the processor 102. In some embodiments, the input device 108 may be integrated with the display device 110, for example, as a touchscreen or similar touch-sensitive display. In some embodiments, the input device 108 comprises a touchscreen such that text may be input by using a virtual keyboard displayed on the touchscreen and/or by handwriting on the touchscreen. In some embodiments, the input device 108 comprises two or more different devices, such as a keyboard and a touch panel.

In some embodiments, the input device 108 may include a document scanner, a digital camera, or other imager configured to create a digital image of a physical document and/or create a digital document from the digital image of the physical document. In certain embodiments, the input device 108 is coupled to an external scanner and/or imager and receives a digital image and/or a digital document as input. In some embodiments, the input device 108 may include a device configured to receive a user credential, such as a microphone (for voiceprint), a fingerprint reader, a camera, a token reader, a ID card reader, or the like.

The display device 110, in one embodiment, is configured to output visual, audible, and/or haptic signals. In some embodiments, the display device 110 includes an electronic display capable of outputting visual data to a user. For example, the display device 110 may include an LCD display, an LED display, an OLED display, a projector, or similar display device capable of outputting images, text, or the like to a user.

In certain embodiments, the display device 110 may receive instructions and/or data for output from the processor 102 and/or the signature module 106. For example, the display device 110 may display a digital document. As another example, the display device 110 may display a digital representation of a receive user signature. As yet another example, the display device 110 may display an icon or other image indicating that the digital document has been digitally signed. In some embodiments, all or portions of the input device 108 may be integrated with the display device 110. For example, the input device 108 and display device 110 may form a touchscreen or similar touch-sensitive display.

Figure 2:
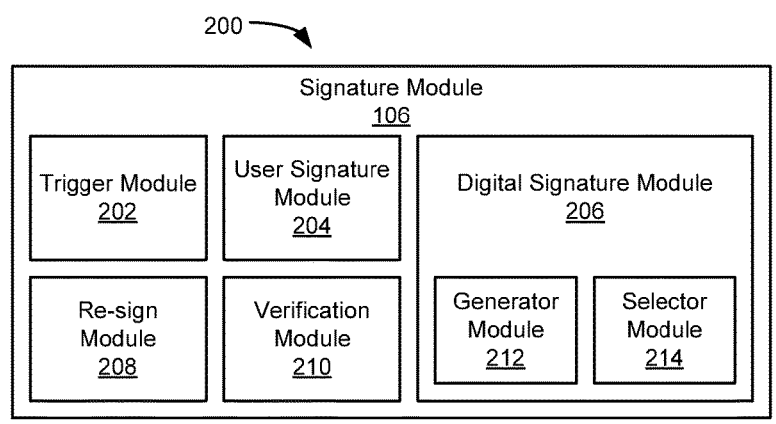
FIG. 2 is a schematic block diagram illustrating one embodiment of an apparatus for digitally signing a document.

FIG. 2 depicts a signature apparatus 200 for digitally signing a document, according to embodiments of the disclosure. The signature apparatus 200, in one embodiment, includes a signature module 106. The signature module 106 may be substantially similar to the signature module 106 described above with reference to FIG. 1. The signature module 106 includes a trigger module 202, a user signature module 204, and a digital signature module 206. In some embodiments, the signature module 106 may also include a re-sign module 208, a verification module 210, a generator module 212, and/or a selector module 214.

The trigger module 202, in one embodiment, is configured to monitor for a trigger. In one embodiment, the trigger is an action relating to the need for a digital signature. In some embodiments, the trigger may be saving the digital document, closing the digital document, or transferring the digital document. In another embodiment, the trigger may be receiving input at a signature field within the digital document. For example, the user may input (via digital pen, touchscreen, or other digitizer) writing at a location corresponding to a signature field, thereby triggering the trigger module 202. In a further embodiment, the trigger may be receiving a biometric and/or electronic user credential. For example, the user may swipe an ID card, scan a contactless ID card (e.g., a near field communication (NFC) or radio frequency identification (RFID) tag), or placing a finger on a fingerprint scanner, thereby triggering the trigger module 202.

Other examples of triggers include, but are not limited to, editing the document, scanning a physical document, attaching the document to an email or other message, uploading the document to another device (e.g., server, computer, data store, or the like), pressing a signature button in a user interface, initiating a signing macro, inserting a signature field, inserting a signature line, touching a displayed document on a touchscreen device, inserting a print signature, electronic signature, or signature image, and the like. Accordingly, in certain embodiments, a user credential submitted within an appropriate time frame of another event is treated as equivalent to a traditional user signature.

In some embodiments, the trigger module 202 may monitor for input from a specific device, the trigger being the input from the specific device. The specific device, in one embodiment, may be an input device associated with receiving a user signature. For example, the specific input device may be a digital pen, a signature pad, or other digitizer used to receive a handwritten signature, and the trigger may be handwritten input from the user. In another embodiment, the specific device may be an imager, such as a scanner, a fax machine, or other device for creating a digital image from a physical document, and the trigger may be creation of the digital image.

The user signature module 204, in one embodiment, is configured to searches for a user signature and/or a user credential associated with a digital document, in response to the trigger. As used herein, a "user signature" refers to a credential, sign, or mark used by a user (the signatory) as proof of identity and/or intent to validate the contents of the document. For example, a user may sign a contract or other legal document indicating their intent to be bound by the contract or legal document and as proof of the user's identity.

In some embodiments, the user signature is a handwritten representation of the user's name and/or of the user's initials. In further embodiments, the user signature may be a digital representation of a handwritten signature. For example, a user may sign a digital document using a digital pen, a touchscreen, a signature pad, or other digitizer. As another example, the user may scan or otherwise convert a physical document to a digital document, thereby converting the handwritten signature into its digital representation.

In certain embodiments, the user signature may be a user credential, such as a biometric or electronic credential, used as proof of the user's identity. For example, a user may scan their fingerprint after opening a document, thereby signaling intent to sign the document (e.g., to certify the contents of the opened document). The biometric or electronic credential may include, but is not limited to, the user's fingerprint, voiceprint, ID card, RFID tag, security token, retinal image, or facial image input with intent to validate the digital document.

In some embodiments, intent to validate the digital document may be inferred by timing of the user signature and/or user (e.g., biometric/electronic) credential. In one embodiment, the user may submit a user credential shortly after (e.g., within a predetermined time frame of) opening the document, saving the document, editing the document, scanning a physical document, attaching the document to an email or other message, or uploading the document to another device (e.g., server, computer, data store, or the like), thereby showing intent to certify the contents of the digital document. In another embodiment, the user may signal intent to sign by submitting a user credential shortly after a signature action, such as pressing a signature button in a user interface, initiating a signing macro, inserting a signature field, inserting a signature line, inserting a print signature, electronic signature, or signature image, and the like. Accordingly, in certain embodiments, a user credential submitted within an appropriate time frame of another event is treated as equivalent to a traditional user signature.

In response to a signal or other indication from the trigger module 202, the user signature module 204 may search for (and detect) the user signature within the digital document. In some embodiments, searching for and/or detecting the user signature includes the user signature module 204 analyzing an image for handwritten characters, for example, handwritten cursive script. In certain embodiments, the user signature module 204 searches a specific portion of the digital document, for example, a signature box or field, and determines whether a user signature is present within the specific portion. In further embodiments, the user signature module 204 searches for a user credential associated with the digital document. For example, the user signature module 204 may search for a fingerprint associated with the digital document, in response to being signaled by the trigger module 202.

In one embodiment, the user signature module 204 searches for a specific user signature within the digital document. For example, the user signature module 204 may search for a specific user signature matching the name of an author of the digital document or of a person identified in a signature boxer field. As another example, if a digital signature was previously applied to the digital document, the user signature module 204 may search for a specific user signature matching the digital signature signatory. In another embodiment, the user signature module 204 detects input from a specific device and searches for a user signature within the input. For example, the user signature module 204 may search only input from a digital pen, touchscreen, a signature pad, or other digitizer used for receiving a user signature.

In some embodiments, the user signature module 204 may send a detected user signature to the verification module 210, wherein the verification module 210 verifies the user signature. For example, the verification module 210 may access a stored handwriting signature sample associated with the signatory and compare the detected user signature to the handwriting signature sample in order to verify the user signature. In certain embodiments, the user signature module 204 may determine an expected signatory for the digital document. For example, the user signature module 204 may examine properties and/or metadata of the digital document to identify an author. As another example, the user signature module 204 may analyze text near signature field to identify a (printed) name of an expected the signatory. Having determined an expected signatory, the user signature module 204 may send the expected signatory to the verification module 210.

The digital signature module 206, in one embodiment, is configured to apply a digital signature to the digital document in response to the digital document including a user signature. As used herein, a digital signature refers to data or other digital information associated with the digital document that demonstrates the authenticity of the digital document. In some embodiments, the digital signature may be embedded within the digital document. For example, the digital signature may be embedded within a specific digital signature field and/or within metadata of the digital document. In other embodiments, the digital signature may be associated with, but separate from the digital document. For example, the digital signature may be an attachment of an email message, the digital signature authenticating the email which it is attached. As another example, a digital document may be packaged with its digital signature, wherein the digital document and the digital signature are stored, opened, and/or transferred together.

In some embodiments, the digital signature module 206 applies a digital signature that is based on the user signature and/or user credential. In certain embodiments, the digital signature may be based on the identity of the signatory. As used herein, the signatory refers to the creator of the user signature. The signatory may also refer to the person identified by the user credential. In one embodiment, the digital signature may be based on an identifier associated with the identity of the signatory, wherein the identifier is used to generate the digital signature. For example, an identifier associated with the identity of the signatory, such as a user ID number, a user account number, a Social Security number, or other identifying number, may be a basis of the digital signature. In another embodiment, the digital signature module 206 may apply a digital signature based on a private key (e.g., of a private/public key pair) belonging to the signatory or based on a shared secret known by the signatory.

In certain embodiments, the digital signature may be based on an identity of the electronic device receiving the user signature. For example, an equipment identifier for an input device (e.g., a digitizer) receiving the user signature may be a basis for the digital signature. As another example, an imager used to scan the digital document containing the user signature may be a basis for the digital signature. In a further example, an editing device such as a mobile phone, a tablet computer, a laptop computer, or other computing device used to view and/or edit the digital document may be a basis of the digital signature.

In some embodiments, the digital signature module 206 generates the digital signature. For example, the digital signature module 206 may use a known signing algorithm to create a digital signature from the digital document. In other embodiments, the digital signature module 206 may select a digital signature from a plurality of predefined digital signatures based on the user signature and/or user credential.

In one embodiment, the digital signature module 206 applies the digital signature only in response to the user signature being a valid signature. For example, the verification module 210 may verify the user signature and signal the digital signature module 206. In response to the verification module indicating a valid user signature, the digital signature module 206 may then apply the digital signature.

In some embodiments, the digital signature module 206 may be further configured to detect an existing digital signature for the digital document. The digital signature module 206 may further identify a user associated with the digital signature. In certain embodiments, the digital signature module 206 may communicate the identity of the user associated with the existing digital signature to the user signature module 204, the re-sign module 208, and/or the verification module 210.

The re-sign module 208, in one embodiment, is configured to automatically reapply the digital signature. The re-sign module 208 may automatically reapply the digital signature when certain conditions are met, for example, regarding an amount of post-signature changes to the digital document, a nature of post-signature changes to the digital document, timing of the post-signature changes, and the like. If the conditions are not met, then the re-sign module 208 may require the user to re-sign the document (e.g., re-inputting the user's signature and/or initials) before reapplying a signature to the edited document. In some embodiments, the re-sign module certifies the editor (e.g., the user making the post-signature changes) prior to reapplying the digital signature.

In some embodiments, automatically reapplying the digital signature includes applying a digital signature to the edited document without waiting for triggering of the trigger module 202 or a manual instruction from the user. For example, reapplying the digital signature may include inputting the edited document and a private key of the signatory into a signing algorithm that produces a digital signature. The same a private key and signing algorithm used to produce the original digital signature may be used when re-signing the digital document. In certain embodiments, the re-sign module 208 instructs the digital signature module 206 to reapplying the digital signature to the edited document.

In one embodiment, the re-sign module 208 reapplies the digital signature in response to a user editing the digital document within a predetermined time period from the application of the digital signature. In certain embodiments, the re-sign module 208 initiates a timer in response to the digital signature module 206 applying the digital signature to the digital document. The re-sign module 208 may automatically reapply the digital signature in response to edits made up until the timer expires, after which the re-sign module 208 may require a new user signature (or initials) before reapplying the digital signature. In other embodiments, the re-sign module 208 may create a timestamp marking the time the digital signature module 206 applies the digital signature to the digital document. In response to user editing the digital document, the re-sign module 208 may compare a current time to the timestamp in order to determine whether the edits are within the predetermined time period from the application of the digital signature.

In one embodiment, the re-sign module 208 reapplies the digital signature in response to the user correcting spelling within the digitally signed document. For example, a user may forget to run a spelling and/or grammar checking algorithm prior to signing the document or prior to triggering the signature module 106 (e.g., by saving the document, closing the document, and/or attempting to transfer the document). Accordingly, the re-sign module 208 may detect that the user corrects spelling within the document (either manually or via a spelling and/or grammar checking algorithm) and may automatically reapply the digital signature.

In one embodiment, the re-sign module 208 automatically reapplies the digital signature up until a predetermined number of edits been made. The predetermined number of edits may be measured by amount of data (e.g., bytes changed), amount of characters changed, or the like. If more than the predetermined number of edits are made, then the re-sign module 208 may require the user to re-sign the document (e.g., re-inputting the user's signature and/or initials) before reapplying a signature to the edited document. In another embodiment, the re-sign module 208 does not automatically reapply the digital signature if major edits are made, such as changes to numbers, dates, names, proper nouns, or other words having significant meanings within the document. For example, if the digital document is a contract then numbers, dates, names, and of the terms may have significant meanings to the contract requiring the user to manually re-sign or re-trigger the signature module 106 (e.g., by saving the document). In a further embodiment, the re-sign module 208 may require the user to re-sign the document (e.g., re-inputting the user's signature and/or initials) before reapplying a signature to the edited document in response to the changes including major edits to the digital document.

In some embodiments, the re-sign module 208 may search for a user's initials in response to the user editing the digital document after application of the digital signature. The re-sign module 208 may automatically reapply the digital signature edited digital document in response to finding the user's initials near the edits. In some embodiments, user initials are not needed for automatic re-signing of the digital document so long as the edits are made within the predetermined time period, are less than the predetermined number of edits, and/or are made to words/characters without significant meanings within the document.

In further embodiments, finding the user's initials may override other criteria used to determine whether or not to automatically re-sign the digital document. For example, finding the user's initials may be an overriding criterion, such that the re-sign module 208 automatically re-signs the digital document even if other criteria are not met. Accordingly, in one embodiment, the re-sign module 208 may automatically reapply the digital signature in response to the user initialing an edit, even if the edits made are outside the predetermined time limit, are not in the same application session as the signature (e.g., after closing and re-opening the document), or are major edits (e.g., more than predetermine amount of changes or changes to numbers, dates, names, proper nouns, etc.).

In one embodiment, the re-sign module 208 reapplies the digital signature in response to validating (certifying) the user. For example, the re-sign module 208 may check a credential of the user and/or may ensure the editor is signatory of an existing digital signature, prior to re-signing the digital document. As another example, the re-sign module 208 may verify that a user's initials near an edit match those of the signatory. In a further embodiment, the re-sign module 208 may skip validating the user if the user recently (e.g., within a predetermined time period) supplied credentials to the electronic device 101. Examples of user credentials useful for validating the user include, but are not limited to, username/password, fingerprint, user ID card, and the like.

In one embodiment, the re-sign module 208 may determine whether post-signature edits made to the digital document are made before the user closes the digital document (e.g., within the same application session) and automatically re-sign the digital document so long as it stays open. In a further embodiment, the re-sign module 208 may skip validating the user's identity if the user supplied credentials to the electronic device 101 within the current application session.

The verification module 210, in one embodiment, is configured to verify the user signature. For example, if a digitizer receives the user signature, a digital version of the user signature may be analyzed and handwriting characteristics of the user signature compared to corresponding handwriting characteristics of the user identified (e.g., named) by the user signature. As another example, the user signature may be compared to handwriting samples or samples of valid user signatures belonging to the user identified (e.g., named) by the user signature. In some embodiments, the verification module 210 signals the digital signature module 206 after verifying the user signature, wherein the digital signature module 206 applies the digital signature in response to the user signature being a valid signature.

In some embodiments, verifying the user signature includes accessing a user profile based on the user signature. In one embodiment, the user profile may contain signature samples, handwriting characteristics, or other data used verify a user signature. In another embodiment, the user profile may indicate whether the user is authorized to sign the digital document. For example, the digital document may be associated with a level of authorization needed to sign set digital document. The user profile may indicate a user's level of authorization, wherein the verification module 210 checks whether the user is authorized to sign the digital document based on the user profile.

In certain embodiments, the verification module 210 may analyze an applied digital signature to ensure the validity of said digital signature. For example, the verification module 210 may check a date associated with the digital signature, for example, to determine whether the digital signature is out of date. If the digital signature is out of date, the verification module 210 may validate the editor, for example, by prompting the user to re-sign, by prompting the user for a credential, and the like. In response to validating the editor, the verification module 210 may signal the re-sign module 208 to reapply the digital signature to the digital document.

In some embodiments, the verification module 210 may validate a user, for example, by certifying a user credential. For example, the verification module 210 may receive input from the input device 108 containing a user credential, wherein the verification module 210 compares the received user credential to an expected user credential (e.g., one or more credential samples for an authorized user stored in memory 104) to validate the user. In one embodiment, the verification module 210 may receive a biometric credential (such as a digitized fingerprint, a voiceprint, a face scan, and eye (retina) scan, or other biometric credential) from the input device 108 and validate the user based on the received biometric credential. In another embodiment, the verification module 210 may receive an electronic authentication credential (such as a username/password, an ID card, an RFID tag, a cryptographic key, or other electronic authentication credential) from the input device 108 and validate the user based on the received electronic authentication credential.

The generator module 212, in one embodiment, is configured to generate a digital signature for the digital document. For example, the digital signature module 206 may use a known algorithm to create a digital signature from the digital document. In some embodiments, the generator module 212 creates the digital signature based on the user signature. In one embodiment, the digital signature module 206 creates the digital signature using a private key belonging to the signatory of the user signature. In another embodiment, the digital signature module 206 may further create the digital signature using the identity of the signatory (for example, a user's ID number, or Social Security number) in combination with the private key.

In some embodiments, the generator module 212 creates the digital signature using a signing algorithm that produces the digital signature when provided the digital document and a secret key. In one embodiment, the secret key is a private key of a private-public key pair of the signatory or a shared secret known by the signatory. In certain embodiments, the signing algorithm may use additional identifying information, such as the date/time, the signatory's identification (e.g., name, Social Security number, and the like), the signing device's identification, and/or the editing/viewing device's identification. The generator module 212 creates a digital signature that can be used by a third-party to verify the authenticity of the digital document, in connection with the public key of the private-public key pair, the digital document, and/or any additional identity information used in the signing algorithm.

The selector module 214, in one embodiment, is configured to select a digital signature for the digital signature module 206 to applied to the digital document. The selected digital signature may be used by third-party to verify the authenticity of the digital document. In one embodiment, the selector module 214 may select a signature scheme or algorithm for digitally signing a document based on the user signature.

In some embodiments, the selector module 214 selects a digital signature from a plurality of predefined digital signatures based on the user signature, for example, based on an identity of a signatory indicated by the user signature. For example, the selector module 214 may identify a user based on the user signature and select a predefined digital signature belonging to that user. In one embodiment, the selected digital signature may be a digital certificate issued to the signatory.

FIGS. 3A-3D are diagrams showing a mobile device 300 for digitally signing a document. The mobile device 300, in one embodiment, is substantially similar to the electronic device 101 described above with reference to FIG. 1. The mobile device 300 may include a touchscreen 302 capable of receiving a user signature. The touchscreen 302, in one embodiment, is substantially similar to the input device 108 and the display device 110 described above with reference to FIG. 1.

Figure 3A:
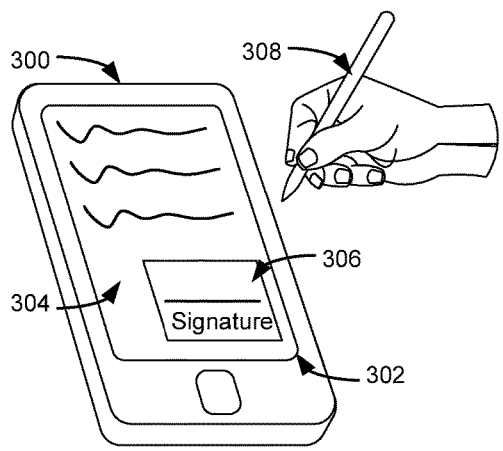
FIG. 3A is a schematic block diagram illustrating one embodiment of an electronic device for digitally signing a document.

FIG. 3A depicts the mobile device 300 displaying the digital document 304, including a signature field 306. The mobile device 300, in one embodiment, awaits a trigger, such as input from a digital pen 308. In other embodiments, the trigger may include a user saving the digital document 304, a user closing the digital document 304, and/or a user attempting to transfer the digital document 304.

In one embodiment, the digital pen 308 comprises a stylus detectable by the touchscreen 302. In another embodiment, the digital pen is a cooperating input device capable of receiving user input corresponding to a user signature and transmitting a digitized version of the user signature to the mobile device 300. In some embodiments, the mobile device 300 inserts the digitized user signature into the digital document 304 in response to receiving the user signature.

Figure 3B:
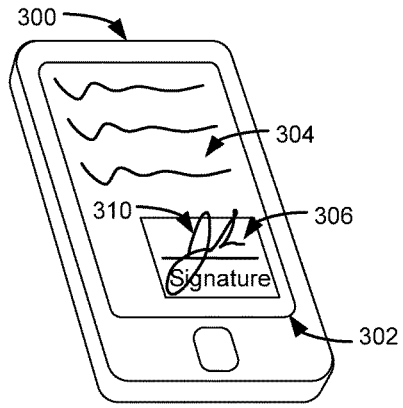
FIG. 3B is a schematic block diagram illustrating the electronic device of FIG. 3A receiving a user signature.

FIG. 3B depicts the mobile device 300 having received a user signature 310. In some embodiments, the user signature is received via the digital pen 308, wherein input from the digital pen 308 triggers the mobile device 300 to detect for a user signature. In further embodiments, the mobile device 300 inserts a digitized version of the user signature into the signature field 306 of the digital document 304, for example, as an image.

In response to receiving a trigger, the mobile device 300 searches for the user signature 310 within the digital document 304. For example, when the user saves the digital document 304, the mobile device 300 may search for the user signature 310.

In one embodiment, the mobile device 300 validates the signatory in response to detecting the user signature 310. For example, the name written by the signatory may be compared to a name associated with the signature field 306. As another example, handwriting characteristics of the user signature 310 may be compared to handwriting characteristics of one or more users authorized to sign the digital document 304. As yet another example, the user signature 310 may be compared to examples of signatures of authorized users.

Figure 3C:
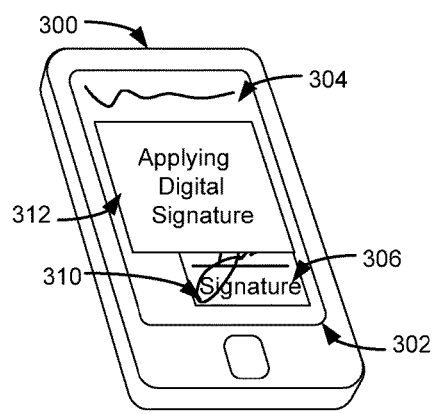
FIG. 3C is a schematic block diagram illustrating the electronic device of FIG. 3A applying a digital signature.

FIG. 3C depicts the mobile device 300 applying a digital signature 312 to the digital document 304. In one embodiment, device 300 applies the digital signature 312 in response to validating the signatory. Applying the digital signature 312 to the digital document 304 may include using the digital document 304 as input to a signing algorithm, wherein the digital signature 312 is the output of the signing algorithm. In one embodiment, the signing algorithm may be selected based on the user signature. In another embodiment, the private key belonging to the user may be used as an additional input to the signing algorithm. In yet another embodiment, the identity of the signatory and/or the digital representation of the user signature may be used as an additional input to the signing algorithm.

In some embodiments, the digital signature 312 is based on the signatory (e.g., on the user signature). For example, the digital signature 312 may be created from a cryptographic key belonging to the signatory. As another example, the digital signature 123 may be selected the plurality of predefined digital signatures based on the identity of the signatory. In other embodiments, the digital signature 312 is based on an identifier of the mobile device 300.

Figure 3D:
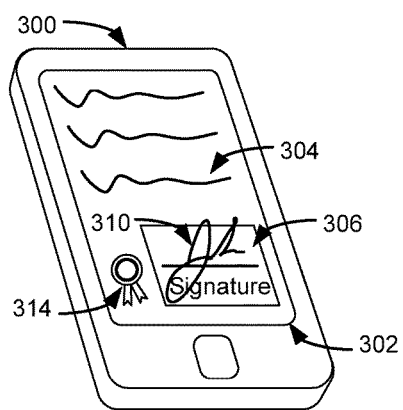
FIG. 3D is a schematic block diagram illustrating the electronic device of FIG. 3A after applying a digital signature.

FIG. 3D depicts the mobile device 300 after applying a digital signature 312 to the digital document 304. In one embodiment, the mobile device 300 displays an icon 314 indicating that the digital document 304 has been digitally signed.

In some embodiments, the mobile device 300 monitors for edits to the digital document 304 after applying the digital signature 312 and automatically reapplies the digital signature 312 when certain conditions are met. For example, the mobile device 300 may automatically reapplying the digital signature 312 if the edits are received within a predetermined time period. As another example, the mobile device 300 may automatically reapply the digital signature 312 in response to a minor edit to the digital document 304, such as correcting spelling within the digital document 304.

Figure 4:
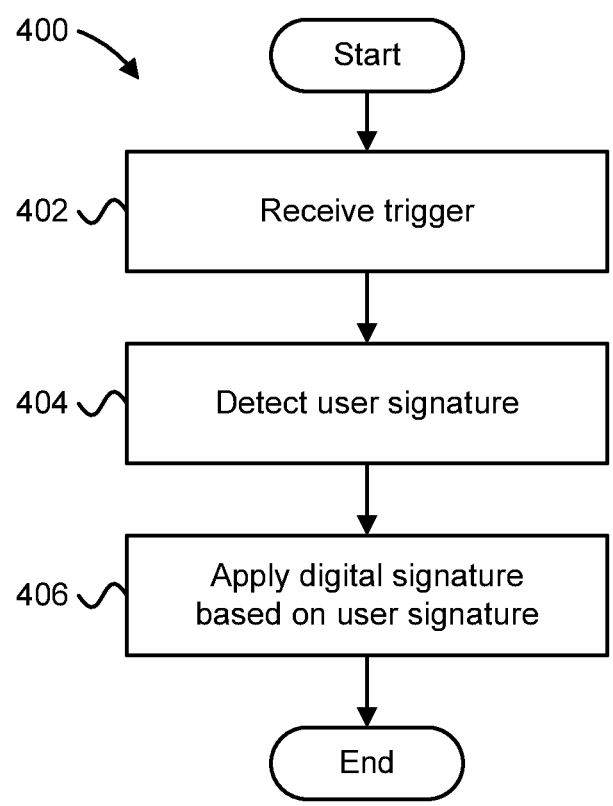
FIG. 4 is a schematic flow chart diagram illustrating one embodiment of a method for digitally signing a document.

FIG. 4 depicts a method 400 for digitally signing a document, according to embodiments of the disclosure. In some embodiments, the method 400 is performed by a signature device, such as the electronic device 101 and/or the mobile device 300 described above with reference to FIGS. 1 and 3. In other embodiments, the method 400 may be performed by a signature module, such as the signature module 106 described above with reference to FIGS. 1 and 2. In certain embodiments, the method 400 may be performed by a processor executing program code, for example, a microcontroller, a microprocessor, a central processing unit (CPU), a graphics processing unit (GPU), an auxiliary processing unit, a FPGA, or the like.

The method 400 begins and the signature device receives 402 a trigger. In one embodiment, the trigger may be a user action, such as one or more of: the user saving the document, the user closing the document, the user attaching the document, and the user transferring the document. In another embodiment, the trigger may include the user inserting a signature field, the user scanning a document, and/or the device receiving input from signature pad or other dedicated signature input device.

The signature device detects 404 whether a user signature exists in the document. In one embodiment, detecting 404 whether the user signature exists may include searching for a user signature within a predetermined signature field. In another embodiment, detecting 404 whether the user signature exists may include searching for handwriting (e.g., a digital image or representation of handwriting) within the document.

The signature device then applies 406 the digital signature to the document based on the user signature. In one embodiment, applying 406 the digital signature may include appending the digital signature to the digital document, for example, as metadata. In another embodiment, applying 406 the digital signature may include populating a predefined portion of the document with the digital signature.

Applying 406 the digital signature based on the user signature may include selecting and/or generating the digital signature based on the identity of the signatory. For example, the digital signature module 206 may create a digital signature using a private key associated with the signatory. As another example, the digital signature module 206 may select a digital signature from a plurality of predefined digital signatures based on the signatory. In certain embodiments, applying 406 the digital signature may include verifying the user signature and applying the digital signature in response to the user signature being a valid signature.

Figure 5:
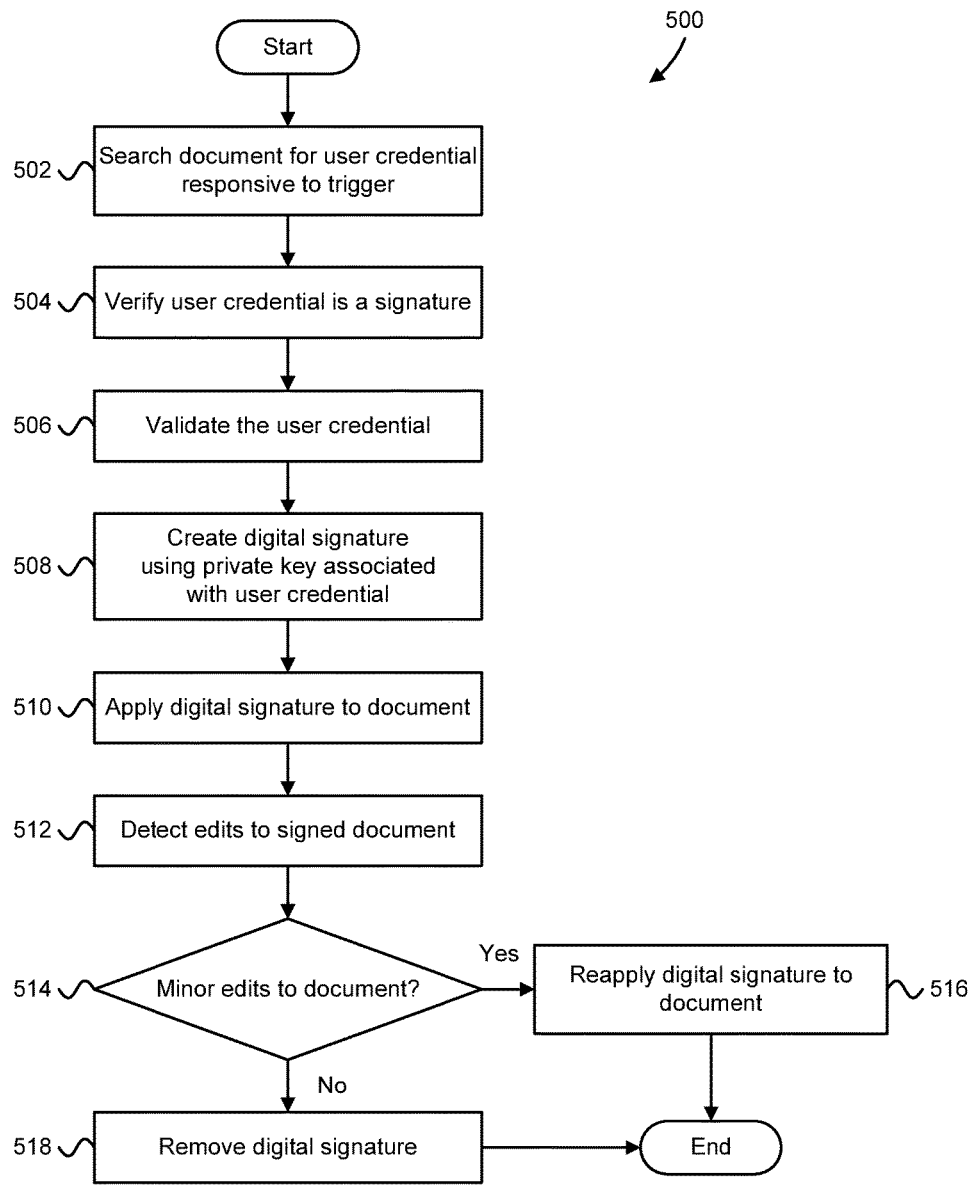
FIG. 5 is a schematic flow chart diagram illustrating another embodiment of a method for digitally signing a document.

FIG. 5 depicts a method 500 for digitally signing a document, according to embodiments of the disclosure. In some embodiments, the method 500 is performed by a signature device, such as the electronic device 101 and/or the mobile device 300 described above with reference to FIGS. 1 and 3. In other embodiments, the method 500 may be performed by a signature module, such as the signature module 106 described above with reference to FIGS. 1 and 2. In certain embodiments, the method 500 may be performed by a processor executing program code, for example, a microcontroller, a microprocessor, a central processing unit (CPU), a graphics processing unit (GPU), an auxiliary processing unit, a FPGA, or the like.

The method 500 begins and the signature device searches 502 a digital document for a user credential responsive to a trigger. In one embodiment, searching 502 for the user credential may include searching for a biometric and/or electronic credential inserted into, or otherwise associated with, the digital document. In one embodiment, the trigger may be a user action, such as one or more of: the user saving the document, the user closing the document, the user attaching the document, and the user transferring the document. In another embodiment, the trigger may include the user inserting a signature field, the user scanning a document, and/or the device receiving input from signature pad or other dedicated signature input device.

The signature device then verifies 504 that the user credential is a signature. In some embodiments, verifying 504 that the user credential is a signature includes determining whether the user credential indicates intent to validate the digital document by the timing of the user credential. In one embodiment, verifying 504 that the user credential is a signature includes comparing a time at which the user credential was received to when document was last opened, saved, or edited. In another embodiment, verifying 504 that the user credential is a signature includes determining whether the user credential was received within a predetermined time limit of the user scanning a physical document, attaching the digital document to an email or other message, or uploading the digital document to another device. In yet another embodiment, verifying 504 that the user credential is a signature includes determining whether the user credential was submitted within a predetermined time period of a signature action, such as pressing a signature button in a user interface, initiating a signing macro, inserting a signature field, inserting a signature line, or inserting a print signature, electronic signature, or signature image.

The signature device also validates 508 the user credential. In some embodiments, validating 506 the user credential includes determining whether the user is authorized to sign the document based on the credential. For example, the user credential may indicate a level of authorization granted to the user. The user's level may compared to an authorization level required by the document, wherein the user is authorized to sign if their authorization level is greater than or equal to that of the document. In other embodiments, verifying 504 the user credential includes checking that the user credential matches the user indicated by a signature line or signature field.

The signature device creates 508 a digital signature using a private key associated with the user credential. In one embodiment, the private key is part of a private-public key pair used by the user to the user signature belongs. In a further embodiment, the private key is selected from a set of private keys belonging to users authorized to sign the document. Both the document and the private key may be used by a signature algorithm to produce the digital signature.

The signature device then applies 510 the digital signature to the document. In one embodiment, applying 510 the digital signature may include appending the digital signature to the digital document, for example, as metadata. In another embodiment, applying 510 the digital signature may include populating a predefined portion of the document with the digital signature.

The signature device detects 512 edits made by the signatory to the digitally signed document and determines 514 whether the edits are minor edits to the document. In one embodiment, minor edits include spelling corrections, grammar corrections, and the like. In another embodiment, minor edits include edits the change less than a predetermined number of characters and/or amount of data. In some embodiments, major edits (e.g., not minor edits) include changes to numbers, dates, names, proper nouns, or other words having significant meanings within the document.

In response to the signature device determining 514 that the edits are minor, the signature device reapplies 516 the digital signature to the document, the digital signature being based on the author and the method 500 ends. Reapplying 516 the digital signature may include re-creating a digital signature and applying the re-created signature. Otherwise, if the signature device determines 514 that the edits are not minor, the signature device removes 518 the digital signature and the method 500 ends.

Figure 6:
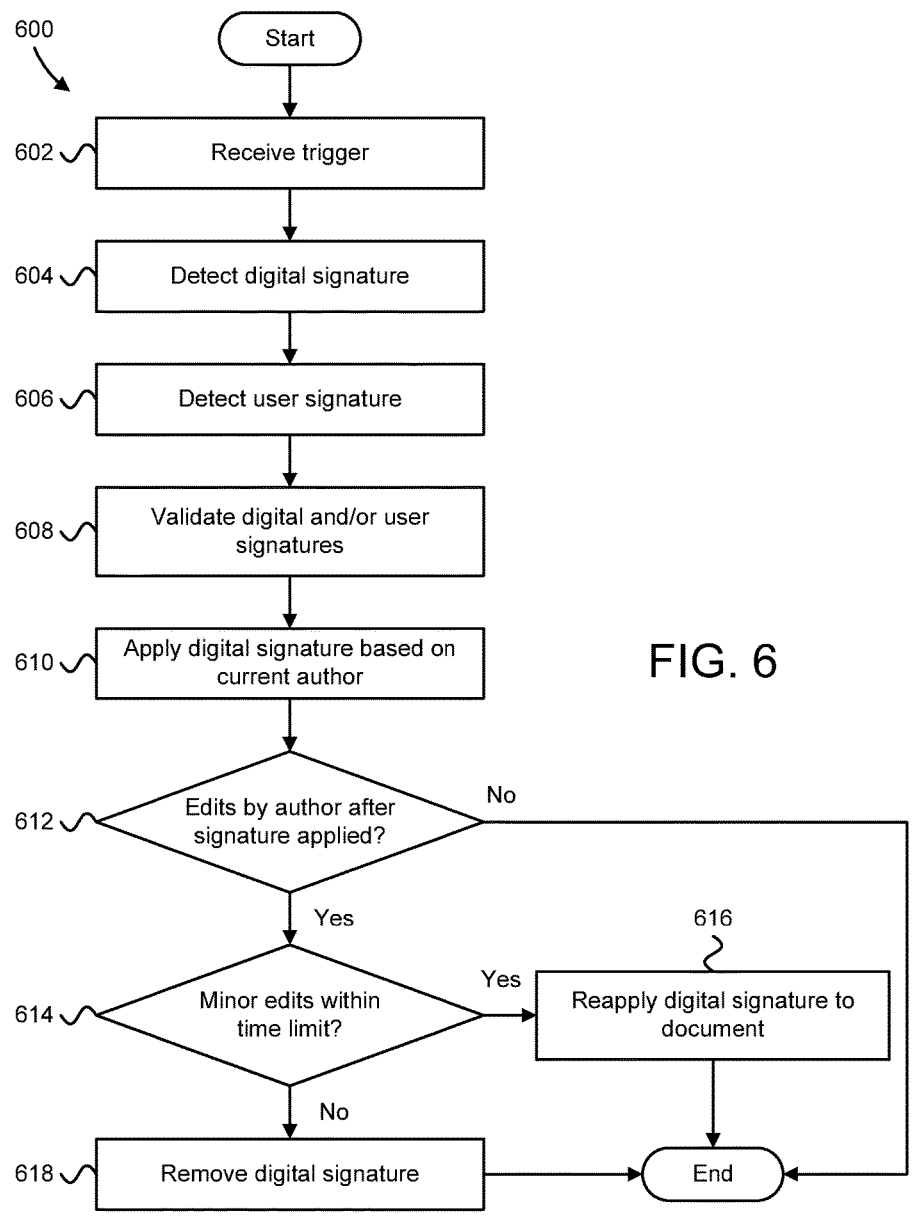
FIG. 6 is a schematic flow chart diagram illustrating another embodiment of a method for digitally signing a document method.

FIG. 6 depicts a method 600 for digitally signing a document, according to embodiments of the disclosure. In some embodiments, the method 600 is performed by a signature device, such as the electronic device 101 and/or the mobile device 300 described above with reference to FIGS. 1 and 3. In other embodiments, the method 600 may be performed by a signature module, such as the signature module 106 described above with reference to FIGS. 1 and 2. In certain embodiments, the method 600 may be performed by a processor executing program code, for example, a microcontroller, a microprocessor, a central processing unit (CPU), a graphics processing unit (GPU), an auxiliary processing unit, a FPGA, or the like.

The method 600 begins and the signature device receives 602 trigger. In one embodiment, the trigger may be a user action, such as one or more of: the user saving the document, the user closing the document, the user attaching the document, and the user transferring the document. In another embodiment, the trigger may include the user inserting a signature field, the user scanning a document, and/or the device receiving input from signature pad or other dedicated signature input device.

The signature device detects 604 whether a digital signature exists in the document and detects 606 whether a user signature exists in the document. In response to detecting 604 a digital signature and/or detecting 606 a user signature, the signature device validates 608 the digital and/or user signatures. In some embodiments, validating 608 the digital and/or user signatures includes determining whether the user signature matches the digital signature. In certain embodiments, validating 608 the digital signature includes checking a date associated with the digital signature. In one embodiment, validating 608 the digital signature includes checking a checksum associated with the document.

In certain embodiments, validating 608 the user signature includes determining whether the user signature matches the identity of the user. In some embodiments, validating the user signature include checking whether the user is authorized to sign the digital document. For example, validating 608 the user signature may include accessing a user profile matching and determining whether the user is authorized to sign the document based on the user profile. In some embodiments, validating 608 the user signature may include comparing the user signature to plurality of valid user signatures. For example, validating 608 the user signature may include comparing a handwriting characteristic of the user signature to a corresponding handwriting characteristic of the user identified by the user signature.

Signature device applies 610 a digital signature to the document based on the current author of the document. Applying 610 the digital signature may include updating and/or reapplying the detected digital signature in response to the current author being identified by the digital signature. In one embodiment, the signature of device verifies the current author prior to applying 610 the digital signature. Verifying the current author may include determining whether the current author is identified by the digital signature and/or user signature. Verifying the current author may include checking credentials of the author in response to the author not matching the digital signature and/or user signature. The signature device then applies 610 a digital signature after verifying the author.

In response to applying 610 the digital signature, the signature device monitors 612 for edits by the author to the document after the digital signature was applied. If the signature device detects 612 that the author makes an edit to the document, it then determines 614 whether the edits are minor edits made within a time limit. Otherwise, if the signature device does not detect 612 edits to the document, the method 600 ends.

Determining 614 whether the edits are minor edits made within a time limit includes examining the nature of the edits. In one embodiment, minor edits include spelling corrections, grammar corrections, and the like. In another embodiment, minor edits include edits the change less than a predetermined number of characters and/or amount of data. In some embodiments, major edits (e.g., not minor edits) include changes to numbers, dates, names, proper nouns, or other words having significant meanings within the document. In one embodiment, the time limit comprises a predetermined (fixed) amount of time from the point in time at which the digital signature was applied 610. In another embodiment, the time limit comprises the end of a current application session or until the document is closed.

In response to the signature device determining 614 that the edits are minor and within the time limit, the signature device reapplies 616 the digital signature to the document, the digital signature being based on the author and the method 600 ends. In certain embodiments, major edits and/or edits made outside the time limit may be remedied by the user initialing the document near the edits, wherein the signature device reapplies 616 the digital signature to the document. Otherwise, if the signature device determines 614 that the edits are not minor and/or are not made within the time limit, the signature device removes 618 the digital signature and the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a processor;
    a memory that stores code executable by the processor to:
        monitor for a trigger;
        determine whether a digital document contains a user signature in response to the trigger;
        apply a cryptographic digital signature to the digital document in response to the digital document including a user signature, wherein the cryptographic digital signature comprises information associated with the digital document that demonstrates the authenticity of the digital document;
        detect one or more edits by a user associated with the user signature to the digital document after the cryptographic digital signature is applied to the digital document;
        determine whether the one or more edits were made within a predetermined time period of application of the cryptographic digital signature;
        determine, in response to determining that the one or more edits were made within a predetermined time period, whether the one or more edits satisfy at least one criterion comprising one of: an amount of editing, a type of edit, and a same application session;
        automatically reapply the cryptographic digital signature to the digital document without requiring the user to apply a second user signature in response to determining that the one or more edits satisfy at least one criterion;
        require the user making the one or more edits to apply a second user signature before reapplying the cryptographic digital signature to the digital document in response to the one or more edits not satisfying at least one criterion; and
        require the user making the one or more edits to apply a second user signature before reapplying the cryptographic digital signature to the digital document in response to determining that the one or more edits were not made within a predetermined time period.

2. The apparatus of claim 1, wherein the processor further generates a cryptographic digital signature for the digital document, wherein the cryptographic digital signature is generated based on the user signature.

3. The apparatus of claim 1, wherein the processor further selects a cryptographic digital signature for the digital document, wherein the cryptographic digital signature is based on an identity of a signatory indicated by the user signature.

4. The apparatus of claim 1, further comprising an electronic device that opens the digital document, wherein the cryptographic digital signature is based on an identity of the electronic device.

5. The apparatus of claim 1, wherein the processor further verifies the user signature, wherein applying the cryptographic digital signature comprises applying the cryptographic digital signature in response to the user signature being a valid signature.

6. The apparatus of claim 5, wherein verifying the user signature comprises:
    accessing a user profile of an individual signing the document based on the user signature; and
    checking whether the individual signing the document is authorized to sign the digital document based on the user profile.

7. The apparatus of claim 5, wherein verifying the user signature comprises comparing the user signature to a plurality of valid user signatures.

8. The apparatus of claim 5, further comprising a digitizer that receives the user signature, wherein verifying the user signature comprises comparing a handwriting characteristic of the user signature to a corresponding handwriting characteristic of a user identified by the user signature.

9. The apparatus of claim 1, further comprising an imager that creates the digital document from a physical document, wherein the trigger comprises creation of the digital document.

10. A method comprising:
receiving a trigger;
determining, by use of a processor, whether a digital document contains a user credential in response to receiving the trigger;
applying a cryptographic digital signature to the digital document, the cryptographic digital signature based on the user credential, the cryptographic digital signature comprising information associated with the digital document that demonstrates the authenticity of the digital document;
detecting one or more edits by a user associated with the user signature to the digital document after the cryptographic digital signature is applied to the digital document;
determining whether the one or more edits were made within a predetermined time period of application of the cryptographic digital signature;
determining, in response to determining that the one or more edits were made within a predetermined time period, whether the one or more edits satisfy at least one criterion comprising one of: an amount of editing, a type of edit, and a same application session;
automatically reapplying the cryptographic digital signature to the digital document without requiring the user to apply a second user signature in response to determining that the one or more edits satisfy at least one criterion;
requiring the user making the one or more edits to apply a second user signature before reapplying the cryptographic digital signature to the digital document in response to the one or more edits not satisfying at least one criterion; and
requiring the user making the one or more edits to apply a second user signature before reapplying the cryptographic digital signature to the digital document in response to determining that the one or more edits were not made within a predetermined time period.

11. The method of claim 10, further comprising creating a cryptographic digital signature using a private key associated with the user credential.

12. The method of claim 10, further comprising selecting a cryptographic digital signature from a plurality of predefined cryptographic digital signatures based on the user credential.

13. The method of claim 10, further comprising verifying the user credential, wherein applying the cryptographic digital signature comprises applying a cryptographic digital signature in response to the user credential being a valid signature.

14. The method of claim 10, further comprising detecting a cryptographic digital signature for the digital document responsive to the trigger, and verifying that the user credential matches the detected cryptographic digital signature.

15. The method of claim 10, wherein reapplying the cryptographic digital signature comprises generating a new cryptographic digital signature based on the edited digital document.

16. The method of claim 10, wherein reapplying a cryptographic digital signature to the digital document without requiring the user to apply a second user signature in response to determining that the one or more edits satisfy at least one criterion comprises reapplying the cryptographic digital signature in response to the user correcting spelling within the digitally signed digital document, wherein reapplying the cryptographic digital signature comprises generating a new cryptographic digital signature based on the edited digital document.

17. The method of claim 10, further comprising:
detecting an attempt to transfer the digitally signed document;
checking the validity of the cryptographic digital signature;
validating a sender in response to the cryptographic digital signature being out of date; and
reapplying the cryptographic digital signature to the digital document without requiring the user to apply a second user signature in response to validating the sender, wherein reapplying the cryptographic digital signature comprises generating a new cryptographic digital signature based on the sender.

18. The method of claim 10, wherein the trigger comprises an action selected from the group comprising: saving the digital document, closing the digital document, and transferring the digital document.

19. A program product comprising a non-transitory computer readable storage medium that stores code executable by a processor, the executable code comprising code to perform:
detecting a trigger;
determining whether a digital document contains a user signature in response to the trigger;
verifying the user signature in response to the digital document including a user signature;
applying a cryptographic digital signature to the digital document, the cryptographic digital signature based on the user signature, wherein the cryptographic digital signature comprise information associated with the digital document that demonstrates the authenticity of the digital document;
detecting one or more edits by a user associated with the user signature to the digital document after the cryptographic digital signature is applied to the digital document;
determining whether the one or more edits were made within a predetermined time period of application of the cryptographic digital signature;
determining, in response to determining that the one or more edits were made within a predetermined time period, whether the one or more edits satisfy at least one criterion comprising one of: an amount of editing, a type of edit, and a same application session;
automatically reapplying the cryptographic digital signature to the digital document without requiring the user to apply a second user signature in response to determining that the one or more edits satisfy at least one criterion;
requiring the user making the one or more edits to apply a second user signature before reapplying the cryptographic digital signature to the digital document in response to the one or more edits not satisfying at least one criterion; and requiring the user making the one or more edits to apply a second user signature before reapplying the cryptographic digital signature to the digital document in response to determining that the one or more edits were not made within a predetermined time period.

20. The program product of claim 19, wherein reapplying the cryptographic digital signature to the digital document without requiring the user to apply a second user signature in response to determining that the one or more edits satisfy at least one criterion comprises generating a new cryptographic digital signature based on the edited digital document in response to the user editing the digital document before closing the digital document.

\* \* \* \* \*